United States Patent [19]

Chaivre et al.

[11] 4,123,961
[45] Nov. 7, 1978

[54] WHEEL NUT WITH WELDED CAP

[75] Inventors: Joseph W. Chaivre; Albert A. Jadach, both of Royal Oak, Mich.

[73] Assignee: Towne Robinson Fastener Company, Southfield, Mich.

[21] Appl. No.: 672,746

[22] Filed: Apr. 1, 1976

[51] Int. Cl.$^2$ ............................................. F16B 37/14
[52] U.S. Cl. ...................................... 85/35; 10/86 C; 219/86.1; 219/107
[58] Field of Search ................ 85/35, 53, 55, 32 WE; 10/9 W, 86 C; 219/91, 93, 86, 87, 104, 107

[56] References Cited

U.S. PATENT DOCUMENTS

| | | | |
|---|---|---|---|
| 407,564 | 7/1889 | Baker | 85/35 |
| 443,799 | 12/1890 | Searls | 85/35 |
| 1,747,490 | 2/1930 | Schneider et al. | 85/35 X |
| 1,936,188 | 11/1933 | Dover | 85/53 |
| 2,042,953 | 6/1936 | McArdle et al. | 85/32 WE X |
| 2,050,867 | 8/1936 | Teare | 85/32 WE X |
| 2,054,245 | 9/1936 | Cummins | 85/9 W X |
| 3,364,806 | 1/1968 | Chanre | 85/35 |
| 3,585,900 | 6/1971 | Chaivre | 85/35 |
| 3,955,231 | 5/1976 | Erdmann | 10/86 C |

FOREIGN PATENT DOCUMENTS

| | | | |
|---|---|---|---|
| 633,186 | 10/1927 | France | 85/35 |
| 512,983 | 2/1955 | Italy | 10/86 C |

*Primary Examiner*—Ramon S. Britts
*Attorney, Agent, or Firm*—Krass & Young

[57] ABSTRACT

A wheel nut having wrench flats extending parallel to a central threaded aperture is sheathed by a sheet metal cap which extends down the sides and covers one end of the nut. The end of the cap may extend straight across the end of the nut or may alternatively be domed to surround a volume extending beyond the end. The cap is welded to the nut at either a ring of points or a continuous ring extending around the nut end. Alternatively, the nut may have a radially extending skirt between its ends and the cap may be welded to the laterally extending sides of the skirt. These resistance welded joinders are formed by supporting the cap in loose assembly with the nut in an electrically conductive fixture, bringing a tubular electrode into pressured contact with the uncapped end of the nut and passing an extremely short pulse of high electric current through the contacting surface of the cap and nut end using a capacitive discharge welding circuit.

10 Claims, 10 Drawing Figures

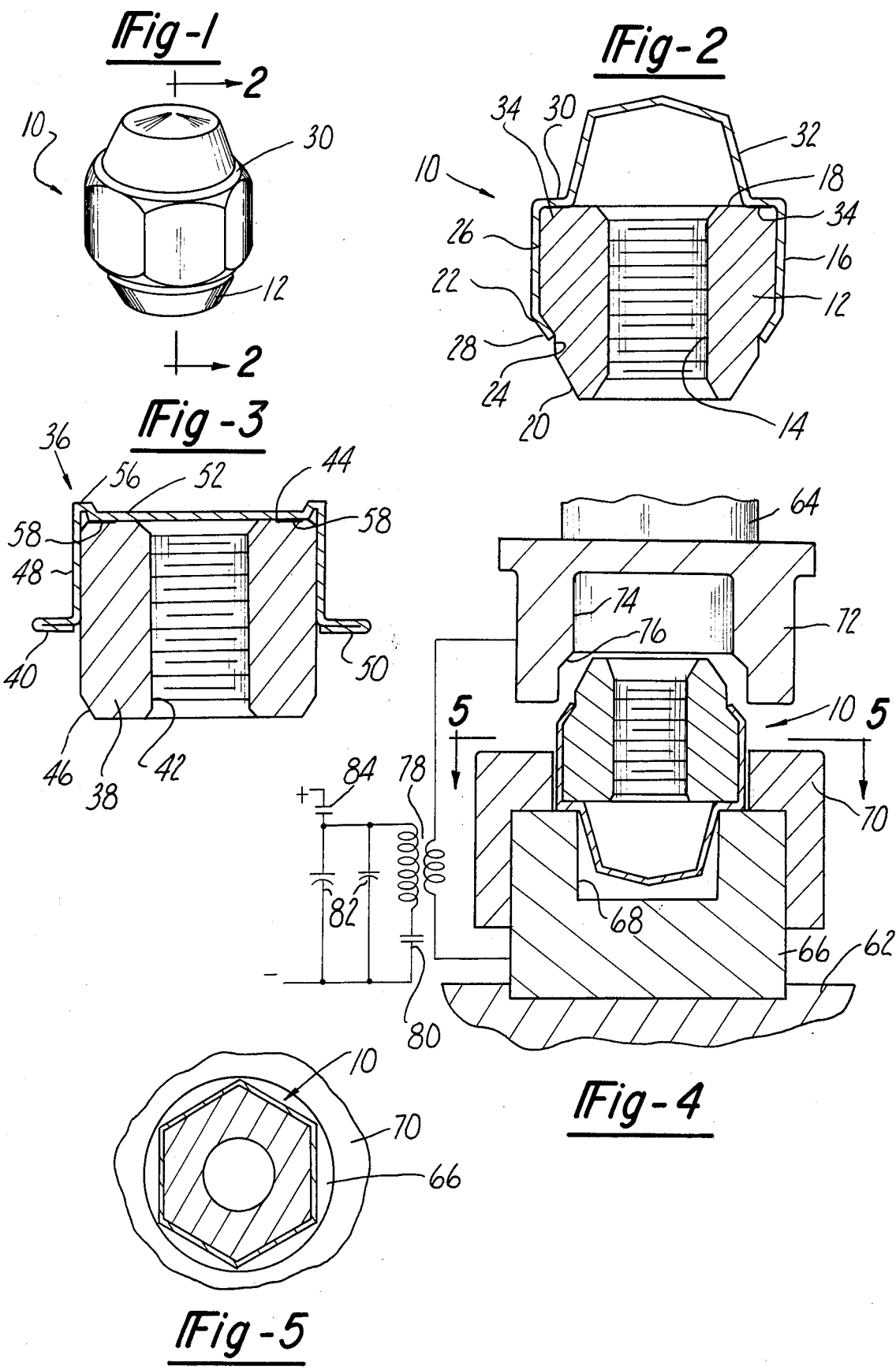

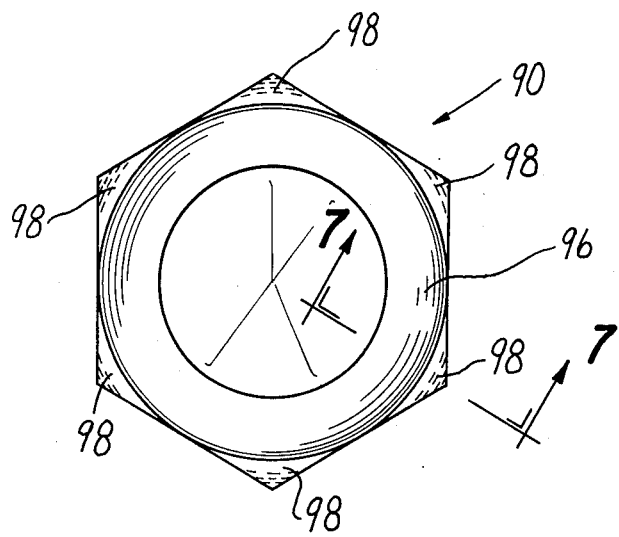
*Fig-6*
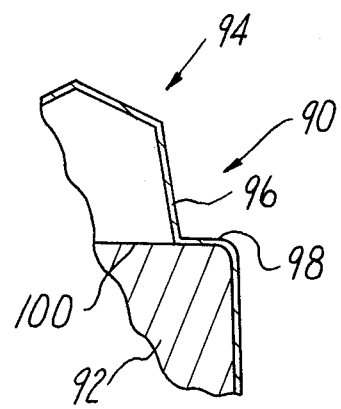
*Fig-7*
*Fig-8*
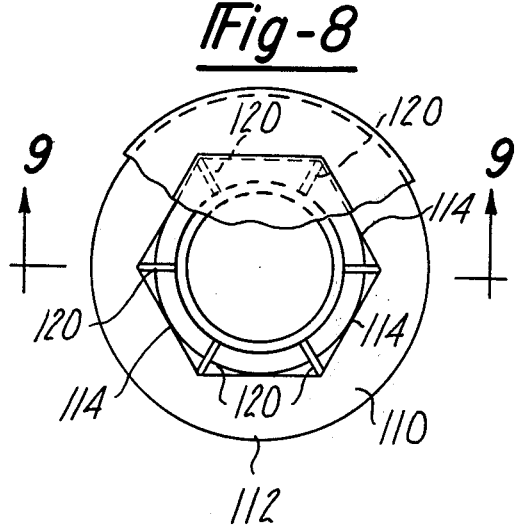
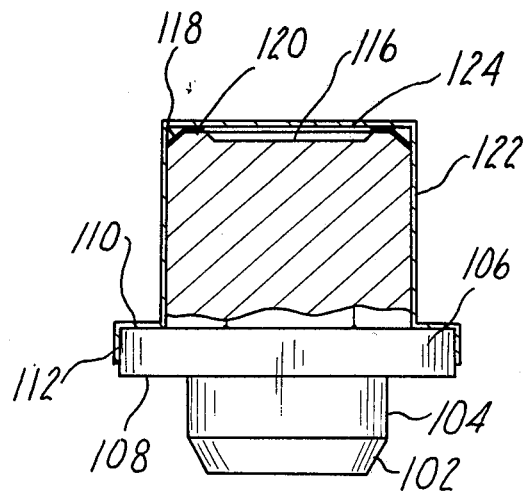
*Fig-9*
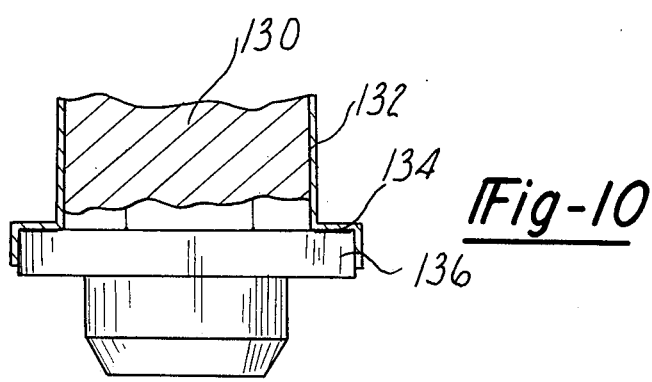
*Fig-10*

WHEEL NUT WITH WELDED CAP

BACKGROUND OF THE INVENTION

1. Field of the Invention

This invention relates to wheel nuts having sheet metal sheaths resistance welded to the nut and to a process of forming such nuts.

2. Prior Art

Most modern automotive wheels are removably attached to the axle by a ring of threaded studs which extend outwardly from conical depressions formed in the axle end. The wheel contains a similar ring of holes formed with conically dished edges which abut the depressions in the axle end so that the studs extend through the wheel holes. Wheel nuts are then threaded on the studs to secure the wheel to the axle. The nuts and extending studs may be surrounded by a dish-shaped cover which attaches to the wheel to hide and protect the nuts and studs. Alternatively, wheel nuts having integral sheaths formed of thin sheet material may be employed. The sheaths cover the exposed nut surfaces and enclose the volume about the end of the nut opposite to that which contacts the wheel. The cap protects the projecting end of the stud from damage due to weathering and impacts. The sheath is typically formed of brushed stainless steel, or plastic, or a combination of the two, for aesthetic purposes.

The sheath or cap must be secured to the nut body to prevent their accidental loosening, particularly under the forces exerted during wrenching of the nuts. Such loosening would cause rattling of the wheel as it rotated and might allow the cap to fall off of the nut. U.S. Patent No. 3,364,806 assigned to the assignee of the present invention, discloses a form of wheel nut wherein the cap is secured to the nut insert by crimping the free end of the cap around the chamfer, or shoulder, formed between the wrench flats and a cylindrical land connecting to the conical end of the nut. Efforts have also been made to secure the cap to the nut body with adhesives because of the low tensile and shear strength of adhesives and because difficulty is encountered in applying sufficient adhesive to securely retain the two without getting the adhesive on the nut threads.

It has also been proposed to weld the cap to the nut. This insures rigid attachment and eliminates the danger of clogging the nut threads with the adhesive, but presents certain problems in application. For one thing, the heat generated in the welding process may adversely affect the heat treatment of the nut, as by unacceptably softening it, and may affect the metallurgy of the cap to discolor it or reduce its oxidation resistance. The present invention is broadly directed toward a form of welded junction between a sheet metal cap and a wheel nut and to a method of forming the weld which eliminates these problems.

SUMMARY OF THE INVENTION

The present invention provides capped wheel nuts wherein the cap is welded to the nut body at points on a surface extending substantially laterally to the central axis of the nut rather than along the axial surfaces which form the major contact areas between the nut and the cap. This allows the welded area to be relatively small and still securely retain the cap to the nut since the forces which are exerted during wrenching impose shear forces on these lateral surfaces and the welds are much stronger in the shear mode than in the tensile mode. If the welds were formed on the axial contacting surfaces they would have to be appreciably larger, enhancing the discoloration problem.

The cap and nut of one embodiment of the present invention are designed with a section about the perimeter of the joinder between the cap end and the section of the cap that covers the nut wrench flats extending laterally to the nut axis so that it overlays a ring formed about the perimeter of the flat end of the nut. The contacting surfaces of the cap and the nut are resistance welded together by contacting the outer surface of the cap, at the ring of contact, with a tubular electrode; using this tubular electrode and another electrode which projects against the exposed end of the nut to exert pressure between the contacting surfaces of the cam and the nut; and passing a high intensity, short duration electrical pulse between the electrodes. This sharp current pulse is preferably obtained by using a capacitive discharge welding circuit.

In one alternative embodiment the cap is welded to the nut body at a series of spaced points on the top lateral surface of the nut surrounding the central axis rather than in a continuous ring. The aggregate area of these points is sufficient to provide adequate shear strength to retain the cap to the nut during wrenching. To aid in the formation of this type of joint the nut body may be formed with a number of raised areas spaced around its end which act as weld studs during the pressured resistance welding cycle.

Another form of capped nut utilizing the present invention has a radial flange projecting from one end of the wrench flats, adjacent to the end of the nut which engages the wheel. This flange may serve to retain a wheel cover having a ring of holes through which the nuts project or may simply serve an aesthetic purpose with a conventional wheel. The cap covers this flange with the free edge of the cap terminating at the base of the flange opposite to the capped end of the nut. The cap is welded to either or both radial surfaces of the flange.

The invention further contemplates a novel production fixture for achieving the weld. A loosely assembled cap and nut are supported with the outer surface of the cap, adjacent the contacting ring in abutment with an annular electrode, by an insulating tube which has an inside diameter that just accepts the edges of the hexagonal wrench flats. The conical end of the nut thus projects upwardly from the fixture and is contacted by an electrode tube having chamfered edges. In the preferred embodiment of the invention approximately 3,500 pounds of force are exerted between the two supporting electrodes. A weld voltage of approximately 3 volts is employed and the weld current lasts for about 6-9 microseconds and reaches a peak of approximately 75,000 amperes. This combination achieves an excellent weld along the ring of contact between the laterally extending section of the cap and the underlying section of the cap end and avoids annealing the nut, discoloring the cap surface as a result of oxidation, or precipitating the carbon in the stainless steel cap to the grain boundaries to lower its corrosion resistance.

Other objectives, advantages and applications of the invention will be made apparent by the following detailed description of several preferred embodiments of the invention. The description makes reference to the accompanying drawings in which:

FIG. 1 is a perspective view of a capped wheel nut formed in accordance with the present invention;

FIG. 2 is a sectional view through the nut of FIG. 1 taken along line 2—2 of FIG. 1;

FIG. 3 is a sectional view through another capped wheel nut forming an alternative embodiment of the present invention;

FIG. 4 is a sectional view through a welding fixture loaded with the components of a capped wheel nut of the type illustrated in FIGS. 1 and 2 illustrating the process of welding the cap to the nut body, with the capacitive discharge welding circuit illustrated schematically;

FIG. 5 is a sectional view through the nut and fixture of FIG. 4, taken along line 5—5 of FIG. 4;

FIG. 6 is a top view of another embodiment wherein the cap is welded to the nut end at points located at the corners of the flats;

FIG. 7 is a detailed sectional view of the capped nut of FIG. 6 taken along line 7—7 of FIG. 6;

FIG. 8 is a top view, partially broken away, of another embodiment of the invention in which raised weld projections are formed around the top of a nut body;

FIG. 9 is a sectional view through the capped nut of FIG. 8, taken along line 9—9 of that FIGURE; and FIG. 10 is a sectional view through a capped nut having a radial flange with the cap welded to the lateral surface of the flange.

The capped wheel nut illustrated in FIGS. 1 and 2, generally indicated at 10, has a configuration generally resembling the nut of U.S. Pat. No. 3,364,806. The nut body or insert 12, has a central threaded aperture 14 and hexagonal wrench flats 16 arranged parallel to the axis of the aperture. One end of the nut 18 is generally flat and the other end of the nut is formed with a conical surface 20 that is adapted to mate with the conical depressions typically formed around the stud holes in a conventional automotive wheel. The ends of the wrench flats 16 adjacent to the conical end 20 are formed with a laterally inwardly directed chamfer or shoulder 22 to meet a short cylindrical land 24 which connects with the conical end 20. The land 24 may have a diameter approximating the width of the nut body between a pair of opposed wrench flats 16 so that the chamfer or shoulder 22 extends only adjacent the corners of the flats.

The nut body 12 is covered by a sheath or cap formed of sheet metal, preferably stainless steel. The cap has sections 26 which extend over the wrench flats 16 and the free edge of the cap is turned over the chamfer 22, so as to terminate adjacent the cylindrical land 24. This arrangement, claimed in U.S. Pat. No. 3,364,806, provides a neat termination for the free edge 28 of the sheath, formed so that edge will not interfere with the secure joinder of the nut to the conical wheel depression, and the forces exerted between the nut and the wheel will not tend to loosen the cap from the nut body.

The other end of the cap is formed with a flat, laterally extending "ring" 30 which projects normally to the section 26 of the cap and accordingly has its inner surface in close abutment to the outer peripheral edge of the nut end 18. This ring extends around the full perimeter of the cap. The cap has a cylindrical domed end 32 extending upwardly from the nut end 18. The cap provides clearance for ends of studs which may project beyond the nut ends 18 and also serves an aesthetic purpose.

The flat, normally extending ring 30 overlies a section of the flat end 18 of the nut from the base of the domed section 32 to the corner connecting to the flat covering sections 26. The width of the ring varies along its perimeter, from a minimum at the center of one of the flat sections, but the minimum width is preferably at least about 0.025 inches.

The capped wheel nut as heretofore described is substantially the same as the nut described in U.S. Pat. No 3,364,806, with the exception of the provision of the laterally extending ring 30. In the present capped nut 10, the contacting surfaces of the ring 30 and the nut end 18 are resistance welded together, as at 34. This weld securely retains the cap to the nut body 12 so that their engagement does not depend upon the bend of free end 28 of the cap around the chamfered section 22 of the nut body. This welded joinder securely retains the nut against the forces that tend to dislodge the cap from the body during wrenching of the nut, and impact forces experienced while the nut is in service. As will be subsequently described, the weld is formed in such a manner as to leave the finish of the sheet metal cap unimpaired.

FIG. 3 illustrates an alternative form of capped wheel nut, generally indicated at 36, conforming to the present invention. The nut body 38 has hexagonal wrench flats 40 extending parallel to a central threaded aperture 42. One end of the nut 44 is formed flat, and the other end is formed with a conical end 46 adapted to mate with a conical wheel depression.

The nut body 38 is partially covered by a stainless steep cap having a section 48 extending over a portion of the wrench flats. The free end of the cap section 48 is bent outward, laterally to the wrench flats, and then returned inwardly, to form a flange 50 in accordance with the teachings of copending application Ser. No. 274,364 assigned to the Assignee of the present invention. This flange 50 covers the joinder between the nut and a wheel and may act to retain a wheel cover over the wheel. The upper end of the cap 52 extends normally between the sides 48 so as to lie in abutment to the flat end 44 of the nut. A crowned rim 56 connects the sides 48 of the cap to the end 52 leaving the outer surface of the central section of the cap end 52 somewhat recessed, for aesthetic and protective purposes.

A portion of the abutting surfaces of the nut end 44 and the cap section 52, adjacent the outer perimeter of their area of contact, are resistance welded together as at 58. This line of welding terminates substantially short of the edge of the threaded aperture 42, to eliminate the possibility of distortion to the aperture which would interfere with mating of the aperture to a stud. This welded joinder securely retains the cap to the nut body 38.

Welding of the caps to nut bodies, in accordance with the method of the present invention, is preferably performed in apparatus of the type illustrated in FIGS. 4 and 5. The apparatus is shown assembling a nut of the type illustrated in FIGS. 1 and 2, generally indicated at 10, but could also operate to assemble a nut of the type illustrated in FIG. 3.

The apparatus employs a press mechanism having a fixed lower platen 62 and an upper movable platen 64. The balance of the press apparatus is conventional, and is not illustrated.

A lower steel die 66 is supported in the lower platen 62. The die 66 has an upwardly extending annular support section 68. The internal diameter of the section 68 is equal to the internal diameter of the weld ring to be formed between the nut body and cap of the assembly 10. An annular sleeve 70 formed of phenolic or a similar thermo-set plastic is supported over the annular section 68 of the die. The interior diameter of the plastic retainer 70 is slightly larger than the cross dimension of the cap across the corners of the wrench flats.

Accordingly, when the loosely assembled nut and cap 10 are inserted into the plastic retainer 70, the domed section of the cap extends within the interior diameter of the annular section 68, with the outer surface of the cap, at the ring section, resting on the top of the annular section 68. The cap is held within the retainer 70, so that the uncapped, chamfered end of the nut projects upwardly above the retainer 70.

A steel upper die member 72 is fixed to and projects downwardly from the upper platen 64. The die 72 has a central opening 74 and a chamfered edge 76 which extends at an angle complementary to the cone angle of the chamfer at the end of the nut 10. When the press platens 62 and 64 are brought together this chamfer engages the conical end of the nut and presses the nut downwardly against the upper end of annular die section 68, pressing the nut insert against the inner surface of the cap at the ring area. The press force is preferably in the range of 3,000 to 4,000 pounds.

A welding current is then applied to the nut and insert via a welding circuit which includes a transformer 78 having its secondary coil connected to the dies 66 and 72. The primary of the transformer 78 is connected in series with a contactor 80 across a bank of relatively large electrolytic capacitors 82. The capacitors may be connected to a charging source by a second contactor 84. In operation, the contacts 80 are opened and the contacts 84 are closed to charge the capacitors 82. Then the contacts 84 are opened and the contacts 80 are closed, discharging the energy stored in the capacitors 82 through the primary of the transformer 78. This induces a current in the secondary which is passed between the nut insert and the cap at the ring area.

The weld voltage typically varies between 2 and 5 volts and the weld current must be more than about 50,000 amperes and preferably will be in the range of 60,000 to 80,000 amperes. The weld time must be less than about 30 microseconds and will typically be from 6 to 9 microseconds. As a result, heating occurs principally at the interface between the cap and the nut, at the ring area. The weld time is so short that the cap does not oxidize and the heating action does not cause the carbon in the stainless steel to migrate to the grain boundaries to lower its corrosion resistance. The heat applied to the nut is not sufficient to affect its hardness.

The welding circuit illustrated is a simplified version of a conventional capacitor discharge circuit, and it should be understood that any type of welder circuit which can apply in extremely short duration; high current pulse to the interface between the cap and the nut, while the nut is being forced into the cap at the ring area, could be used with the present invention.

FIGS. 6 and 7 illustrate another embodiment of the invention consisting of a capped wheel nut, generally indicated at 90, having a nut body 92 sheathed in a cap, generally indicated at 94. The base diameter of the domed section 96 of the cap is substantially equal to the diameter of the nut across the flats. Accordingly, laterally extending sections 98 wherein the cap 94 extends axially over the top surface 100 of the nut 92, only occur above the corners of the wrench flats.

The cap 94 is welded to the body 92 at these laterally extending areas 98. Like the other embodiments of the invention, these lateral areas are subjected to shear forces when the nut is wrenched and act to resist these forces to retain the cap securely to the nut body.

FIGS. 8 and 9 illustrate a capped wheel nut wherein the nut insert is formed with a conical end 102 formed beneath a cylindrical section 104. A flange 106 which projects radially beyond the diameter of the cylindrical section 104 is formed above the cylindrical section. The flange 106 has a laterally extending underside 108, a laterally extending upper side 110 and a radially extending edge 112.

The nut body is formed with wrench flats 114 above the flange 106, and terminates in a top end having a central dish-shaped depression 116. The radially outer edges of the top are chamfered at the corners of the wrench flats, as at 118. A radially extending, raised weld nib 120 extends along the top of the nut, between the chamber 118, and the central depression 116, at each of these corners.

The nut of FIGS. 8 and 9 is sheathed by a stainless steel cap 122 which projects over the top of the nut, and a flat section 124, down the wrench flats, and around the edges of the flange 106. The free end of the sheath terminates adjacent to the intersection of the bottom lateral edge of the sheath 108 with the cylindrical land 104.

During assembly, the inner surface of the top edge 124 of the cap contacts the weld nibs 120 so that a highly pressurized contact is formed between them during the weld cycle. This insures that the weld current will flow through these relatively narrow points, providing a firm joinder between the cap and the nut body. Similar laterally extending weld nibs could be used with other forms of nut body.

FIG. 10 illustrates an embodiment of the invention wherein a nut insert 130, which is substantially identical to the insert of FIGS. 8 and 9, except that it does not have weld nibs 120, is joined to a cap 132 by welds formed between the two at a ring 134 extending over the upper lateral surface of the nut flange 136. Like the joinders formed on the lateral surface of the nut end, this lateral ring resists forces tending to pull the cap away from the nut body and these forces are exerted on the weld in a shear mode, which is a weld they can strongly resist.

The embodiments of the invention in which an exclusive property or privilege is claimed are defined as follows:

1. A nut having a central threaded aperture, polygonal sides, a first end adapted to engage a wheel, a second end having an end face extending at right angles to the axis of the nut, and a sheet metal cap for the nut having a section extending over the polygonal sides and and end section adapted to cover the second end of the nut, said end section being connected to the section of the cap which covers the polygonal sides by a section formed fully around the perimeter of the cap and having an extension at right angles to the axis of the nut so as to be parallel to said end face, such connecting section being in juxtaposed contact throughout a substantial area with and welded to said end face, whereby forces exerted on the capped sides creating moments about the central axis of the nut will result in shear forces exerted on the weld.

2. The nut of claim 1 wherein the cap is welded to the nut in a continuous line of weld extending fully around the central aperture.

3. The nut of claim 1 wherein the cap is formed of a stainless steel.

4. The nut of claim 1 wherein the end section of the cap is flat and extends fully across the end of the nut opposite to the first end.

5. The nut of claim 1 including a chamfered surface extending between the polygonal flats and the first end of the nut and wherein the cap has an angled section which contacts said chamfer.

6. The nut of claim 5 wherein the laterally extending section of the cap contacts said angled section.

7. The nut of claim 1 including a plurality of raised weld nubs formed on said nut surface having an extension laterally to the central axis of the nut, which act to contact said cap.

8. A capped wheel nut, including a nut body having a central threaded aperture, polygonal sides, and a conical end and a laterally extending end, and a sheet metal cap for the nut having a first section covering at least a portion of said polygonal sides and a second section covering the laterally extending end of the nut, said second section being in contact with the laterally extending nut end in a continuous ring of substantial area extending about and being normal to the central axis of the nut, said cap being welded to the nut at said ring so that forces exerted between the nut and cap during wrenching by forces exerted on the capped sides creating moments about the central axis of the nut will produce shear forces on the weld.

9. The caped nut of claim 8 wherein the nut body has a plurality of raised weld nibs formed about said surface having a lateral extension.

10. The nut body of claim 8 having a flange which extends radially beyond the polygonal sides and in which the cap is welded to the body at a lateral surface of said flange.

* * * * *

UNITED STATES PATENT AND TRADEMARK OFFICE
Certificate

Patent No. 4,123,961                           Patented November 7, 1978

Joseph W. Chaivre and Albert A. Jadach

Application having been made by Joseph W. Chaivre and Albert A. Jadach, the inventors named in the patent above identified, and Towne Robinson Fastener Company, Dearborn, Michigan, a Corporation of Michigan, the assignee, for the issuance of a certificate under the provisions of Title 35, Section 256, of the United States Code, deleting the name of Joseph W. Chaivre as a joint inventor, and a showing and proof of facts satisfying the requirements of the said section having been submitted, it is this 24th day of June 1980, certified that the name of the said Joseph W. Chaivre is hereby deleted from the said patent as a joint inventor with the said Albert A. Jadach.

*Associate Solicitor.*

REEXAMINATION CERTIFICATE (535th)
United States Patent [19]
Jadach

[11] B1 4,123,961
[45] Certificate Issued Jul. 22, 1986

[54] WHEEL NUT WITH WELDED CAP

[75] Inventor: Albert A. Jadach, Royal Oak, Mich.

[73] Assignee: Towne Robinson Fastener Company, Southfield, Mich.

Reexamination Reqs:st:
No. 90/000,694, Dec. 20, 1984
No. 90/000,704, Jan. 8, 1985

Reexamination Certificate for:
Patent No.: 4,123,961
Issued: Nov. 7, 1978
Appl. No.: 672,746
Filed: Apr. 1, 1976

Certificate of Correction issued Jun. 24, 1984.

[51] Int. Cl.[4] .............................................. F16B 37/14
[52] U.S. Cl. ................................. 411/429; 10/86 C; 411/376; 411/396
[58] Field of Search ...................... 411/171, 371-373, 411/375, 376, 396, 427, 429-431; 10/86 C

[56] References Cited

U.S. PATENT DOCUMENTS

| | | | |
|---|---|---|---|
| 154,255 | 8/1874 | Ives | 411/429 |
| 407,564 | 7/1889 | Baker | 411/429 |
| 443,799 | 12/1890 | Searls | 411/429 |
| 1,747,490 | 2/1930 | Schneider et al. | 411/396 |
| 1,936,188 | 11/1933 | Dover | 411/473 |
| 2,042,953 | 6/1936 | McCardle et al. | 411/171 |
| 2,050,867 | 8/1936 | Teare | 220/2.3 R X |
| 2,054,245 | 9/1936 | Cummins | 72/391 X |
| 2,391,989 | 1/1946 | Luce | 411/247 |
| 3,140,738 | 7/1964 | Johnson | 411/171 |
| 3,364,806 | 1/1968 | Chaivre | 411/430 |
| 3,585,900 | 6/1971 | Chaivre | 411/430 |
| 3,955,231 | 5/1976 | Erdmann | 10/86 C |
| 4,018,133 | 4/1977 | Chaivre et al. | 411/429 |

FOREIGN PATENT DOCUMENTS

| | | | |
|---|---|---|---|
| 631186 | 10/1927 | France | 411/429 |
| 512983 | 2/1955 | Italy | 40/86 C |
| 739405 | 10/1955 | United Kingdom | |

OTHER PUBLICATIONS

"Automotive Welding Design", American Welding Society, Copyright 1961, pp. 1–48.

*Primary Examiner*—Thomas J. Holko

[57] ABSTRACT

A wheel nut having wrench flats extending parallel to a central threaded aperture is sheathed by a sheet metal cap which extends down the sides and covers one end of the nut. The end of the cap may extend straight across the end of the nut or may alternatively be domed to surround a volume extending beyond the end. The cap is welded to the nut at either a ring of points or a continuous ring extending around the nut end. Alternatively, the nut may have a radially extending skirt between its ends and the cap may be welded to the laterally extending sides of the skirt. These resistance welded joinders are formed by supporting the cap in loose assembly with the nut in an electrically conductive fixture, bringing a tubular electrode into pressured contact with the uncapped end of the nut and passing an extremely short pulse of high electric current through the contacting surface of the cap and nut end using a capacitive discharge welding circuit.

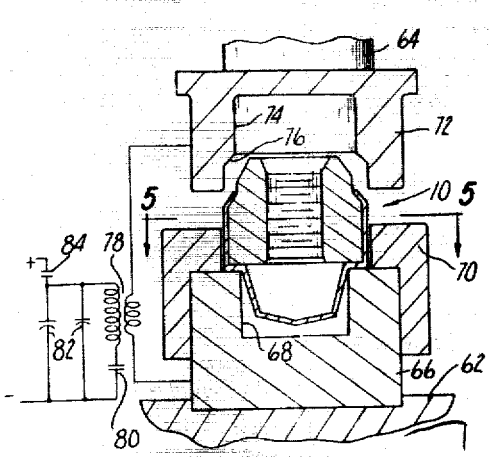

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 5-10 are determined to be patentable as amended.

Claims 2-4, dependent on an amended claim, are determined to be patentable.

1. A *decorative* nut *for holding a wheel on a motor vehicle and exposed to view on the wheel, said nut* having a central threaded aperture, polygonal sides, a first end adapted to engage a wheel, a second end *opposite said first end and* having an end face extending at right angles to the axis of the nut, and a sheet metal cap for the nut *and* having a section extending over the polygonal sides *of the nut* and [and] an end section adapted to cover the second end of the nut, *said section extending over the polygonal nut sides including a plurality of cap wrench flats respectively associated with and oppositely facing said polygonal nut sides, said cap wrench flats and said polygonal nut sides being disposed between said first and second ends of said nut,* said end section being connected to the section of the cap which covers the polygonal *nut* sides by a section formed fully around the perimeter of the cap and having an extension at right angles to the axis of the nut so as to be parallel to said end face, such connecting section being in juxtaposed contact throughout a substantial area with and welded to said end face, [whereby forces exerted on the capped sides creating moments about the central axis of the nut will result in shear forces exerted on the weld.] *the position of welded contact between the connecting section and the end face resulting in shear forces being applied to the weld in response to the application of forces on the capped wrench flats which create moments about the central axis of the nut.*

5. The nut of claim 1 including a chamfered surface extending between the polygonal [flats] *sides* and the first end of the nut and wherein the cap has an angled section which contacts said chamfer.

6. The nut of claim 5 wherein [the laterally extending section of the cap contacts] said angled section *extends from the section of the cap extending over the polygonal nut sides.*

7. The nut of claim 1 including a plurality of raised weld nubs formed on said nut [surface] *end face, said weld nubs* having an extension laterally to the central axis of the nut[,] which act to contact said cap.

8. A *decorative* capped wheel nut *for holding a wheel on a motor vehicle and exposed to view on the wheel,* including a nut body having a central threaded aperture, [polygonal sides, and] a conical end [and], a laterally extending end *and polygonal sides between said conical end and said laterally extending end,* [and a] *said* sheet metal cap for the nut *body, said cap* having a first section covering at least a portion of said polygonal *nut* sides and *including a plurality of cap wrench flats respectively associated with and oppositely facing the polygonal nut sides, said cap further having* a second section covering the laterally extending end of the nut, said second section being in contact with the laterally extending nut end in a continuous ring of substantial area extending about and being normal to the central axis of the nut, said cap being welded to the nut at said ring so that forces exerted between the nut and cap during wrenching by forces exerted on the [capped sides] *cap wrench flats* creating moments about the central axis of the nut will produce shear forces on the weld.

9. The [caped] *capped* nut of claim 8, wherein the nut body has a plurality of raised weld nibs formed about said [surface] *laterally extending end and* having a lateral extension.

10. The [nut body] *capped wheel nut* of claim 8 [having] *wherein said laterally extending end of said nut body is defined by* a flange which extends radially beyond the polygonal sides and in which the cap is welded to the body at a lateral surface of said flange.

* * * * *